United States Patent [19]

Ryan

[11] Patent Number: 4,981,623
[45] Date of Patent: Jan. 1, 1991

[54] DIFFUSER FOR AERATION BASIN
[75] Inventor: Richard J. Ryan, Rockford, Ill.
[73] Assignee: AquaTec, Inc., Rockford, Ill.
[21] Appl. No.: 491,987
[22] Filed: Mar. 12, 1990
[51] Int. Cl.⁵ ................................................ B01F 3/04
[52] U.S. Cl. .................................................... 261/122
[58] Field of Search ............... 261/122; 135/119; 24/265 C

[56] References Cited

U.S. PATENT DOCUMENTS

| | | | |
|---|---|---|---|
| 985,243 | 2/1911 | Bahan | 135/98 |
| 2,652,845 | 9/1953 | O'Neill et al. | 135/34 |
| 2,746,469 | 5/1956 | D'Andrea | 135/34 |
| 2,889,171 | 6/1959 | Morris | 135/119 |
| 3,225,408 | 12/1965 | Durham | 135/119 |
| 3,997,634 | 12/1976 | Downs | 261/122 |
| 4,734,191 | 3/1988 | Schussler | 261/122 |
| 4,764,314 | 8/1988 | Schneider | 261/122 |
| 4,869,852 | 9/1989 | Goudy, Jr. et al. | 261/122 |

Primary Examiner—Tim Miles
Attorney, Agent, or Firm—Douglas B. White

[57] ABSTRACT

Generally there is provided an elastomeric diffuser membrane configured to overlie a planar base and to wrap around the edge. A plurality of lobe extensions of the membrane protrude under the base and are interconnected by a strap to secure the membrane to the base.

5 Claims, 3 Drawing Sheets

U.S. Patent  Jan. 1, 1991  Sheet 1 of 3  4,981,623
FIG. 1
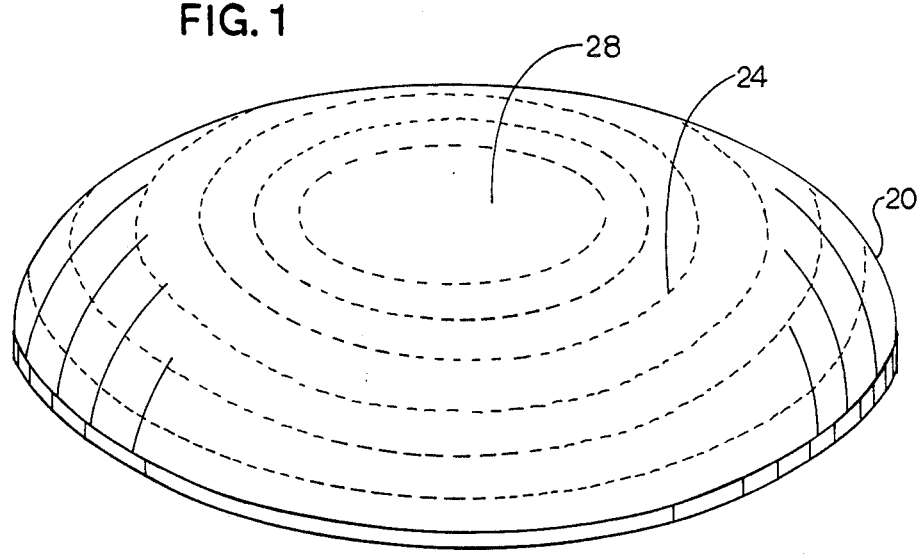
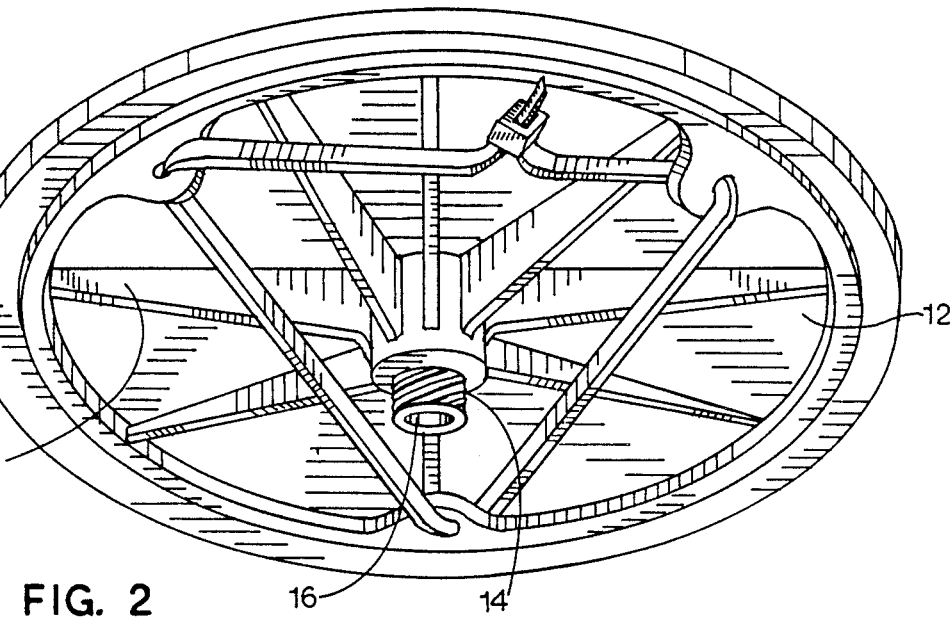
FIG. 2

DIFFUSER FOR AERATION BASIN

BACKGROUND OF THE INVENTION

1. Field of the Invention

This invention relates generally to aeration equipment for introducing gas bubbles into aeration basins. More particularly this invention relates to disc type diffusers utilizing flexible membranes thereon and to techniques for securing the membrane to the disc body of the diffuser.

2. Description of the Prior Art

Diffusers for aeration basins are typically mounted to piping carrying air under pressure and function to generate small bubbles in a basin, tank or reservoir to enhance the transfer of oxygen in the reservoir. Flexible membrane diffusers have recently come into prominence due to their ability to generate fine bubbles and improve the overall efficiency of the system. A prior art diffuser of this type employs a disc shaped base fitted to the piping and a flexible membrane mounted to the base. This mounting has taken the form of either a band around the edge of the disc, trapping the membrane against the edge, or by permanently vulcanizing the membrane to the peripheral edge of the disc. (An example of the band attachment method is illustrated in U.S. Pat. No. 4,764,314). If the membrane is not securely attached it will release from the disc when air pressure is applied. Unfortunately, even when the membrane is attached according to these prior art methods, it will occasionally rupture or dislodge during operation, especially if excess air or increased pressure is applied, and the cost of repair or replacement is quite high. Even where the membrane does not release, it will tend to stretch during use and will eventually fail to lay flat against the disc; this allows sludge to accumulate under the membrane and interferes with the operation.

SUMMARY OF THE INVENTION

It is accordingly a principal object of the present invention to provide an improvement to the flexible diaphragm diffuser which will act to maintain the membrane in place during operation to prevent membrane rupture or total membrane dislodging, especially during excess air charges and sudden and/or increased pressure loads. It is a further object to provide effective means to secure the membrane which will also maintain the membrane flat against the base of the diffuser and compensate for the stretching that occurs during use. The unique feature of the improvement is to allow the membrane to partially release from the base preventing total dislodging and/or membrane rupture. However, even if the partial release occurs, the remaining portion of the membrane (which has not been ruptured) still functions as an "anti-backflow" check valve which prevents liquid from entering the piping if the air is interrupted.

Generally there is provided an elastomeric diffuser membrane configured to overlie a first surface of the base of the diffuser and wrap around the edge. A plurality of lobes of the membrane material extend under the base and are interconnected on the underside of the base by a strap.

BRIEF DESCRIPTION OF THE DRAWINGS

FIG. 1 is a perspective view of the flexible membrane diffuser of the present invention as viewed from the top.

FIG. 2 is a perspective view of the flexible membrane diffuser as viewed from the bottom showing the attachment technique of the present invention.

While the invention will be described in connection with a preferred embodiment, it will be understood that I do not intend to limit the invention to that embodiment. On the contrary, I intend to cover all alternatives, modifications, and equivalents as may be included within the spirit and scope of the invention as defined by the appended claims.

DESCRIPTION OF THE PREFERRED EMBODIMENT

Figure 3:
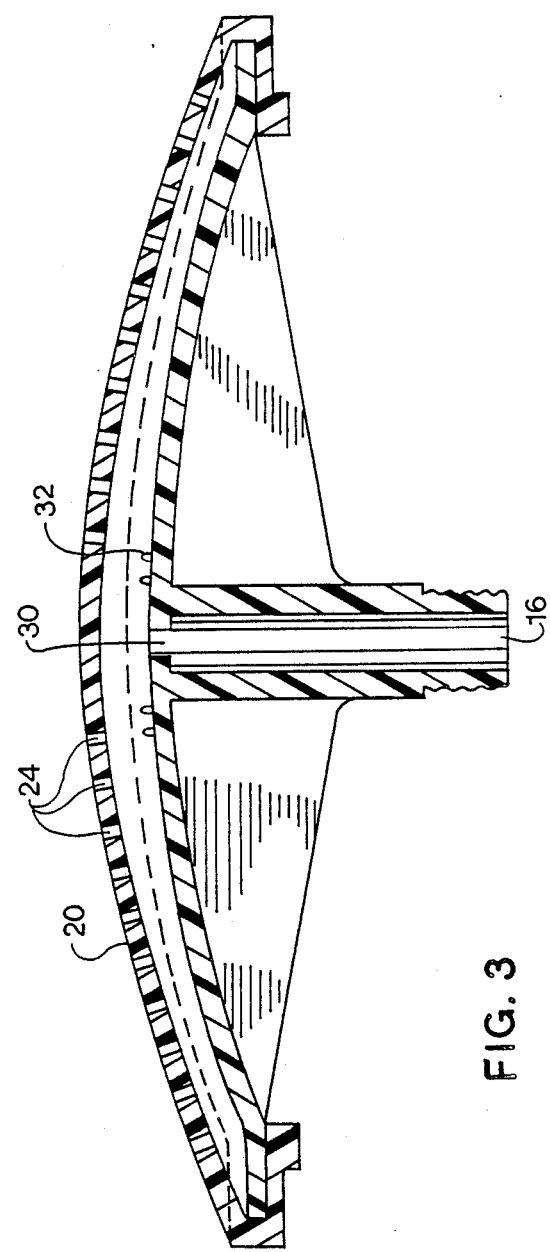
FIG. 3 is a sectional view of the diffuser of FIGS. 1 and 2 not showing the straps off the invention.
Figure 4:
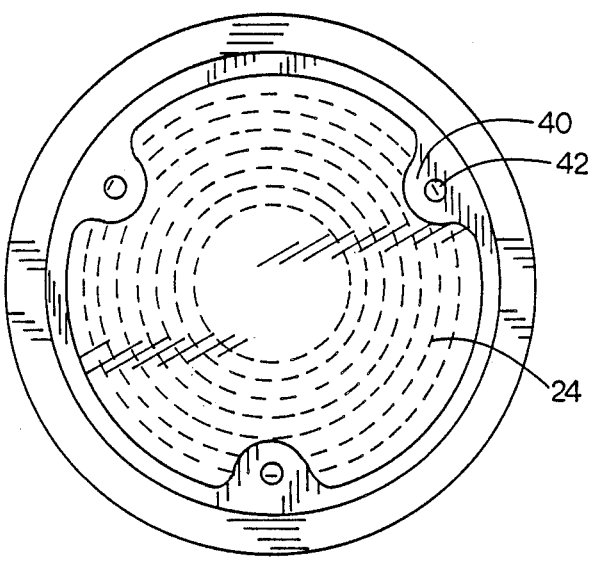
FIG. 4 illustrates a bottom view of the membrane of the invention showing the extending lobes.
Figure 5:
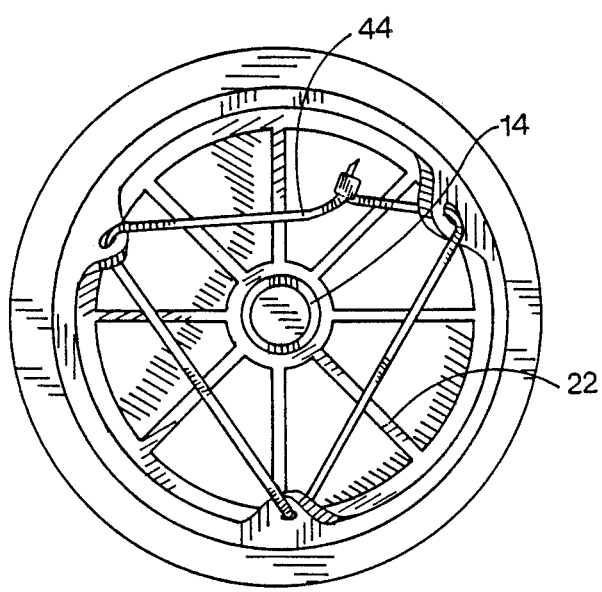
FIG. 5 depicts a bottom view of the diffuser showing the lobes laced together to secure the membrane to the disc.

Turning to FIGS. 1 and 2 there is shown in perspective a top and bottom view of a flexible membrane diffuser in accordance with the present invention. Particularly, a rigid planar base member 12 (a convex disc shape is preferred but the invention is not limited thereto) is provided with a central fitting 14 to accept pressurized gas for aeration of a basin, tank or reservoir. This fitting feeds an orifice 16 (FIG. 3) to direct the pressurized gas through the disc where it emerges under the flexible membrane 20. The base of the diffuser comprises a smooth curved surface on its upper side and a supporting ribbed structure 22 on its underside. Coaxial with the air inlet opening 30 are two small raised circular bosses 32 which provide a contact seat for the membrane when air flow is interrupted.

The flexible membrane covers the top surface of the disc and extends around the edge of the disc. Due to its elastic character, when formed to envelop the edge of the base it generally grasps the edge to hold itself in place to a limited extent. Typically the membrane is composed of an elastomeric material having a pattern of small openings 24 therein. When air is forced through the base inlet it emerges under the membrane, lifts the membrane off of the surface, and expands the openings 24 therein. Air escaping from these openings forms the fine bubbles used in the aeration process. At the center of the membrane there is provided an unperforated portion 28 which acts to form a check valve against the circular bosses coaxial to the air inlet opening 30 in the base when air flow is interrupted.

On the under side of the disc, elastic lobes 40 extend from the membrane and are generally composed of the same elastomeric material as the flexible membrane. These lobes function to flexibly secure the membrane to the base when anchored to the base or to each other. In one form the individual lobes present openings 42 to receive fastening means to hold the membrane. These lobes may be arranged to connect to the base by individual hooks or straps extending from the base. But in the preferred embodiment these lobes are joined by a strap 44 in chordal fashion as shown in the figures to hold the membrane to the base. In the preferred embodiment the strap may comprise a plastic cable tie threaded through the lobes of the membrane. When air pressure shock loads are encountered the membrane may lift at the edge but this strap technique retains the membrane over the disc.

From the foregoing description, it will be apparent that modifications can be made to the apparatus and method for using same without departing from the teachings of the present invention. Accordingly, the scope of the invention is only to be limited as necessitated by the accompanying claims.

I claim:

1. An improved diffuser for use in an aeration basin comprising:
   a planar base member defining a first and second surface and having a gas inlet thereto;
   a flexible elastomeric perforated membrane arranged to envelop the periphery of said base member and covering the first surface thereof, said membrane being arranged to distend from said first surface of said base member upon delivery of gas under pressure to said inlet;
   a plurality of lobes affixed to said membrane and protruding along the second surface of said base member; and
   fastening means attached to said lobes for securing said membrane to said base member.

2. The improved diffuser of claim 1 wherein said lobes are formed as extensions of said membrane.

3. The improved diffuser of claim 2 further comprising openings defined in said lobes for connection to said fastening means.

4. The improved diffuser of claim 3 wherein said fastening means comprises a strap for interconnecting said lobes.

5. The improved diffuser of claim 4 wherein said plurality of lobes comprises at least three lobes and said interconnecting strap connects said lobes in a chordal manner.

* * * * *